United States Patent
Palathingal

Patent Number: 6,074,068
Date of Patent: Jun. 13, 2000

[54] AUTOMOBILE SIDE VIEW MIRROR WITH ZIG-ZAGGED SURFACE

[76] Inventor: Jose Chakkoru Palathingal, 424 Guadarrama La. Miradero Hills, Mayaguez, Puerto Rico 00680

[21] Appl. No.: 09/096,313

[22] Filed: Jun. 11, 1998

[51] Int. Cl.$^7$ ...................................................... B02B 7/182
[52] U.S. Cl. ......................... 359/851; 359/866; 359/883
[58] Field of Search .................................. 359/850, 851, 359/866, 864, 871, 883, 833, 834

[56] References Cited

U.S. PATENT DOCUMENTS

| | | | |
|---|---|---|---|
| 1,808,740 | 6/1931 | Weatherbee . | |
| 3,806,232 | 4/1974 | Gray | 359/851 |
| 4,632,524 | 12/1986 | Blom | 359/851 |
| 4,738,519 | 4/1988 | Stewart . | |
| 5,337,181 | 8/1994 | Kelly | 359/574 |
| 5,847,889 | 12/1998 | Komiyama et al. | 359/850 |

*Primary Examiner*—Cassandra Spyrou
*Assistant Examiner*—Euncha Cherry

[57] ABSTRACT

The disclosure is related to a mirror device for use particularly as a side view mirror for automobiles. Side view mirrors presently in common use comprise of plane mirrors, and are required to be of a limited size. Because of the required small size, the directional range of view such mirrors provide to the driver is quite limited, and leave out of view certain directional ranges which are important from the safety point of view. It is the purpose of this invention to enhance the directional range of view to include within the view of the driver the region on the side commonly known as the blind spot. The device of the invention makes this possible without increasing the size of the mirror, or without causing significant disadvantages. This is made possible by providing a zig-zag surface for the mirror at appropriate offset angle, so that two separate ranges of directional view which are contiguous without overlap are achieved. In a preferred mode, the mirror could comprise of a transparent sheet with appropriate surface contours, a reflector coating and a support backing.

8 Claims, 7 Drawing Sheets

PLAN VIEW

PLAN VIEW

FIGURE 6

PLAN VIEW FIGURE 7

FIGURE 8(a) PLAN VIEW

IMAGE: SIDE VIEW

FIGURE 8(b)

10 FT SCALE

AUTOMOBILE SIDE VIEW MIRROR WITH ZIG-ZAGGED SURFACE

FIELD OF THE INVENTION

The invention is related to side only used in automobiles and moving vehicle or of enhanced directional range of view.

BACKGROUND OF THE INVENTION

The side view mirror commonly of a sheet of plane glass coated in the rear for reflection and mounted inside a box attached to the body of the vehicle. Such a mirror is characterized by the disadvantage that it leaves a region out of the view of the driver, commonly called the blind spot. To avoid the blind spot, some approaches are possible. One such approach employed in the past has been attaching a small curved mirror within the frontal surface of the plane mirror. This however suffers from the fact that the curved mirror being small, viewing into it under driving conditions is not convenient. Besides, a curved mirror gives the observer an incorrect sense of the distance of the object involved.

Mirrors for use by automobile drivers were developed over the past several decades by a good number of inventors, but none of these inventions meets the function intended for the present invention and does not comprise the components of the present device. For example, by U.S. Pat. No. 1,808,740 issued to Weatherbee, a plane glass sheet silvered in the rear is provided with a mechanical fitting which enables the front and rear surfaces to be alternately brought to a reflection position during night or during day. According to U.S. Pat. No. 4,738,519 to Stewart, an elongated mirror device enables the driver to obtain a large directional range of view in the rear of the automobile. But, because of the size and shape that could make it project excessively, it is not suitable for mounting on the side of an automobile for use for side view. In U.S. Pat. No. 5,838,505, Jose C. Palathingal proposes a device in the form of a wedged plane glass mirror with reflective coatings on the front and the rear, the front being partially reflecting and the rear being totally reflecting. The current invention presents an yet alternate novel form of mirror device capable of avoiding the blind spot, a characteristic disadvantage of the present-day side view mirrors. The new invention also has potential for greater ease of manufacture and longer life than the wedged mirror with a plurality of reflective coatings.

SUMMARY OF THE INVENTION

Figure 1:
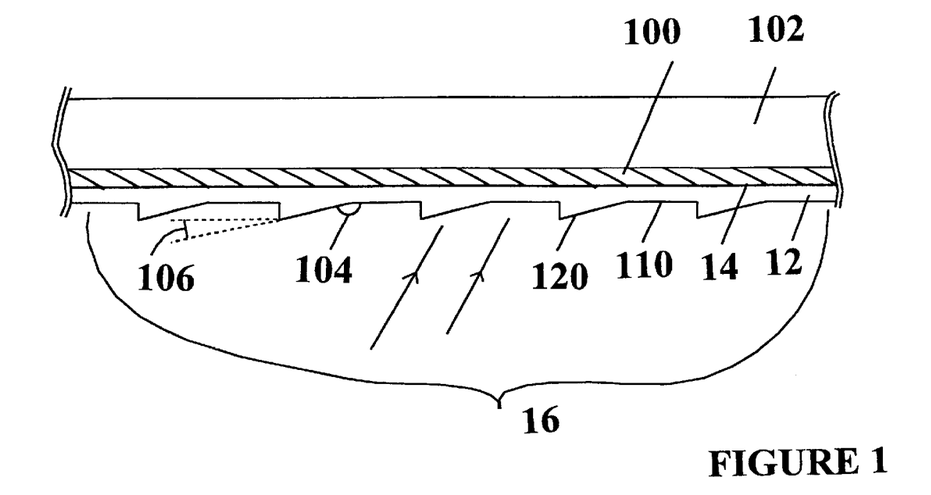
FIG. 1 is an illustrative sketch of the planar view of the saw-tooth surfaced reflection mirror plate having the front surface with a contour combining two series of stripes of alternating incline, wherein one series are parallel to the plane rear surface of the mirror plate.
Figure 2:
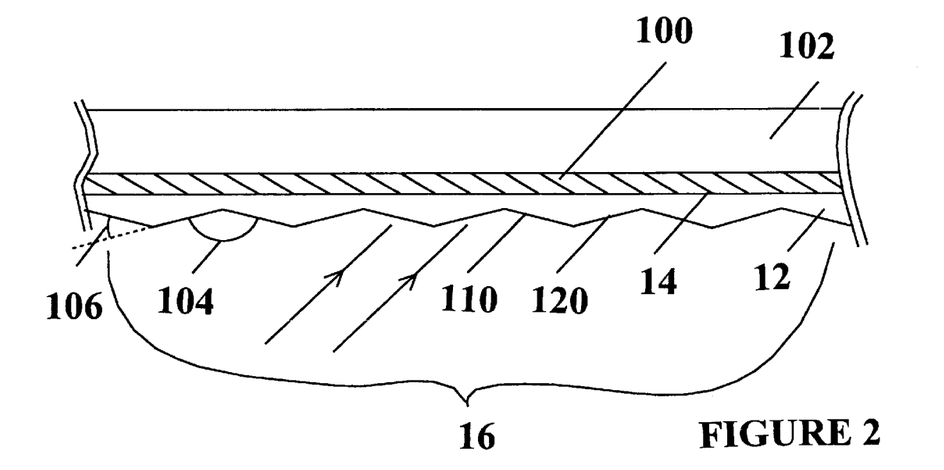
FIG. 2 illustrates the planar view of an alternate contour of zig-zagged surface that may form the front of the mirror plate.
Figure 3A:
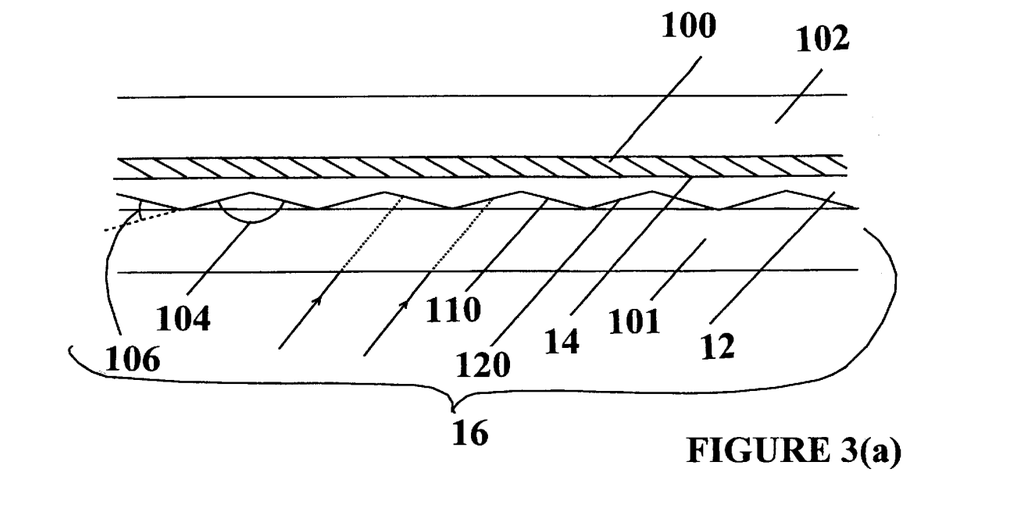
FIGS. 3(a) and 3(b) are planar view sketches illustrating that in distinct embodiments of the invention, either the rear reflecting surface or the front surface of incidence can be zig-zagged. In these embodiments, a transparent front cover plate is additionally prescribed as a frontal protection of the mirror plate.
Figure 3B:
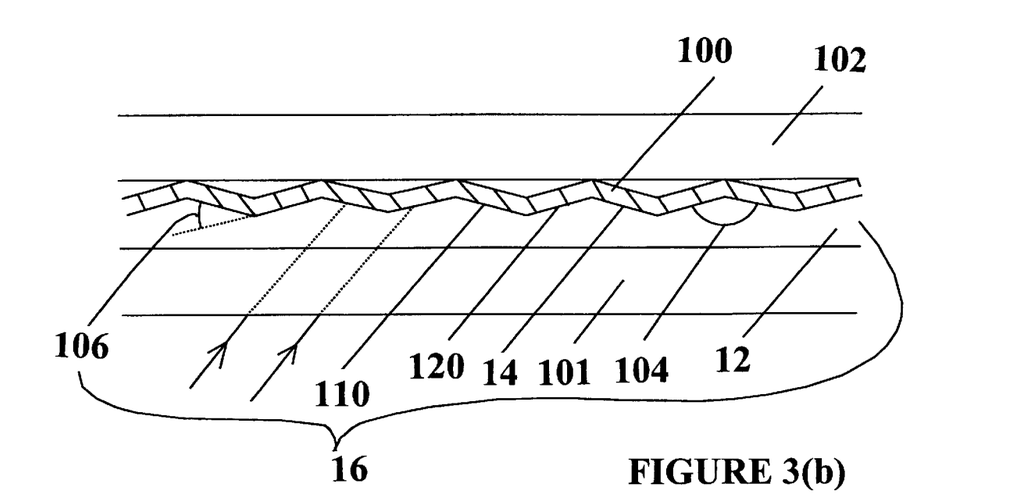

The mirror of the present invention is a sheet of transparent material that has one surface planar and the other surface zig-zagged. The contour of the zig-zagged surface may be formed of a series of planar stripes parallel to the planar surface, interposed by another series of mutually parallel planar stripes inclined to the former. The two series are intermixed at a predetermined angle of inclination as shown in FIG. 1, forming a saw-toothed contour. Alternately, the zig-zagged surface may be formed of a series of obtuse-angled wedges as in FIG. 2. Zig-zagged configurations having surfaces of other acceptable contours may also be had. As shown in FIGS. 3(a), and 3(b), the rear surface of the mirror which shall be coated with a reflecting material for total reflection can be planar or zig-zagged. The frontal surface is nonreflective.

Figure 4:
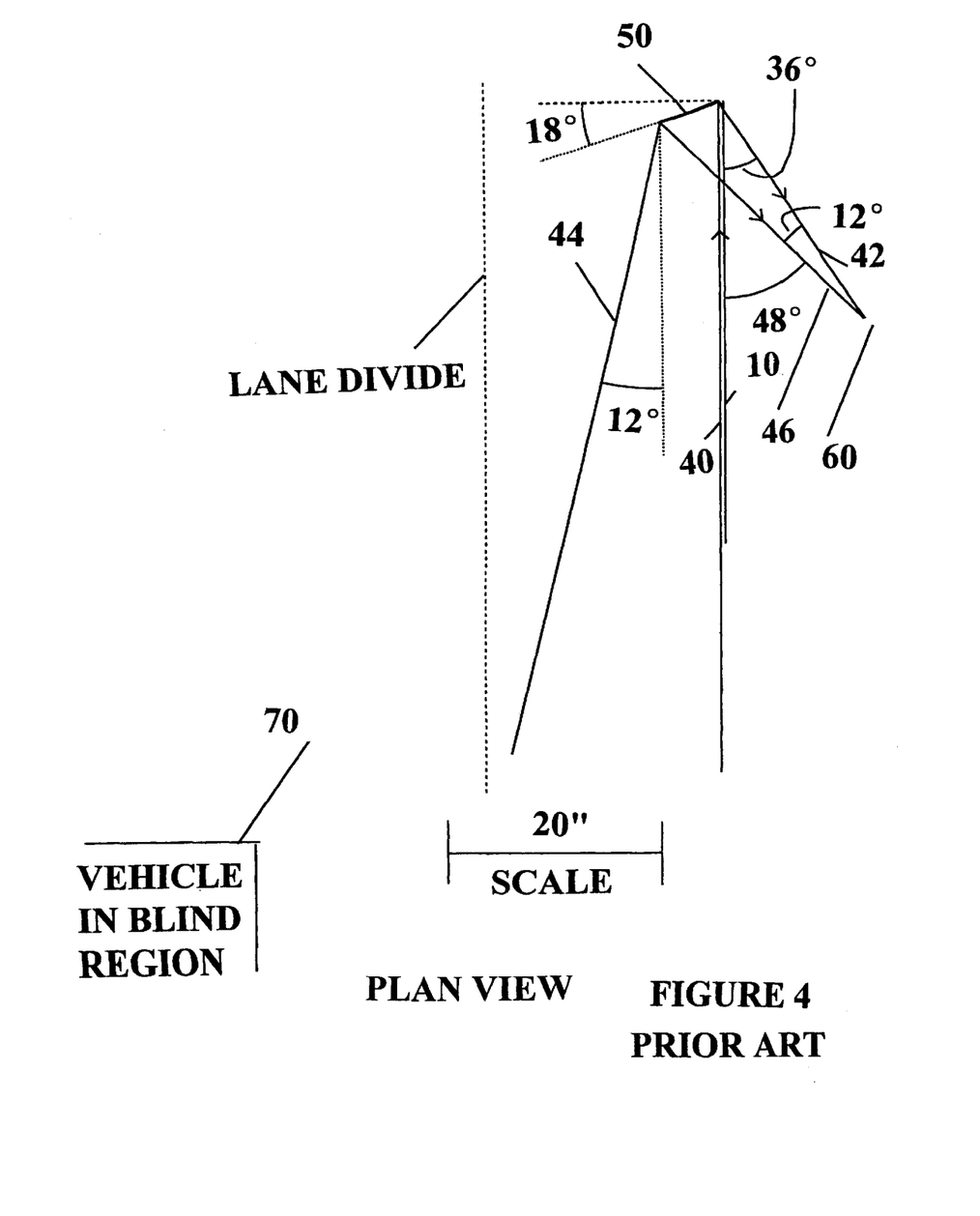
FIG. 4 illustrates the formation of a blind spot while the automobile driver uses a conventional side view mirror.
Figure 5:
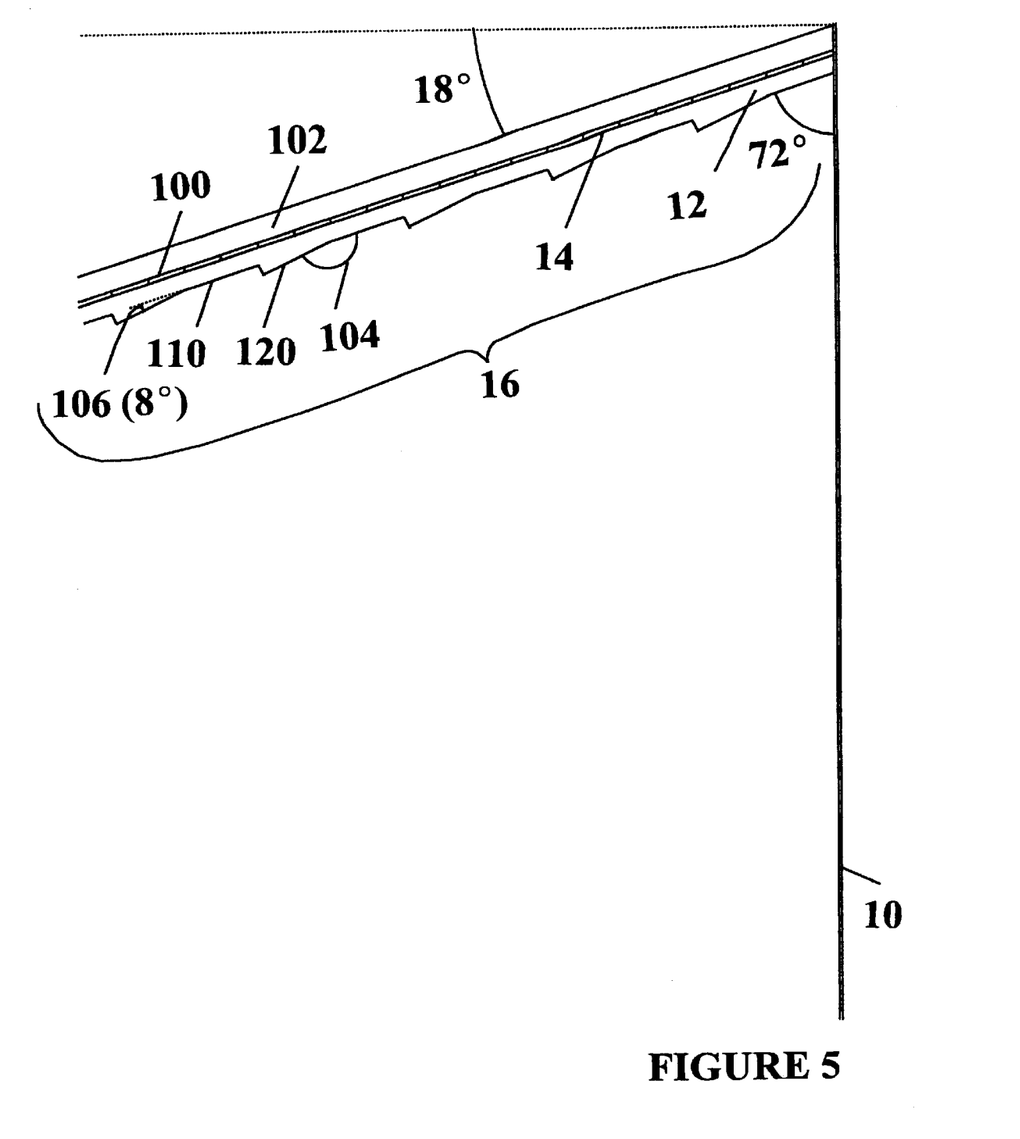
FIG. 5 illustrates the planar view of a typical orientation of a saw-toothed mirror of the type represented by FIG. 1 mounted on an automobile on the left side.
Figure 6:
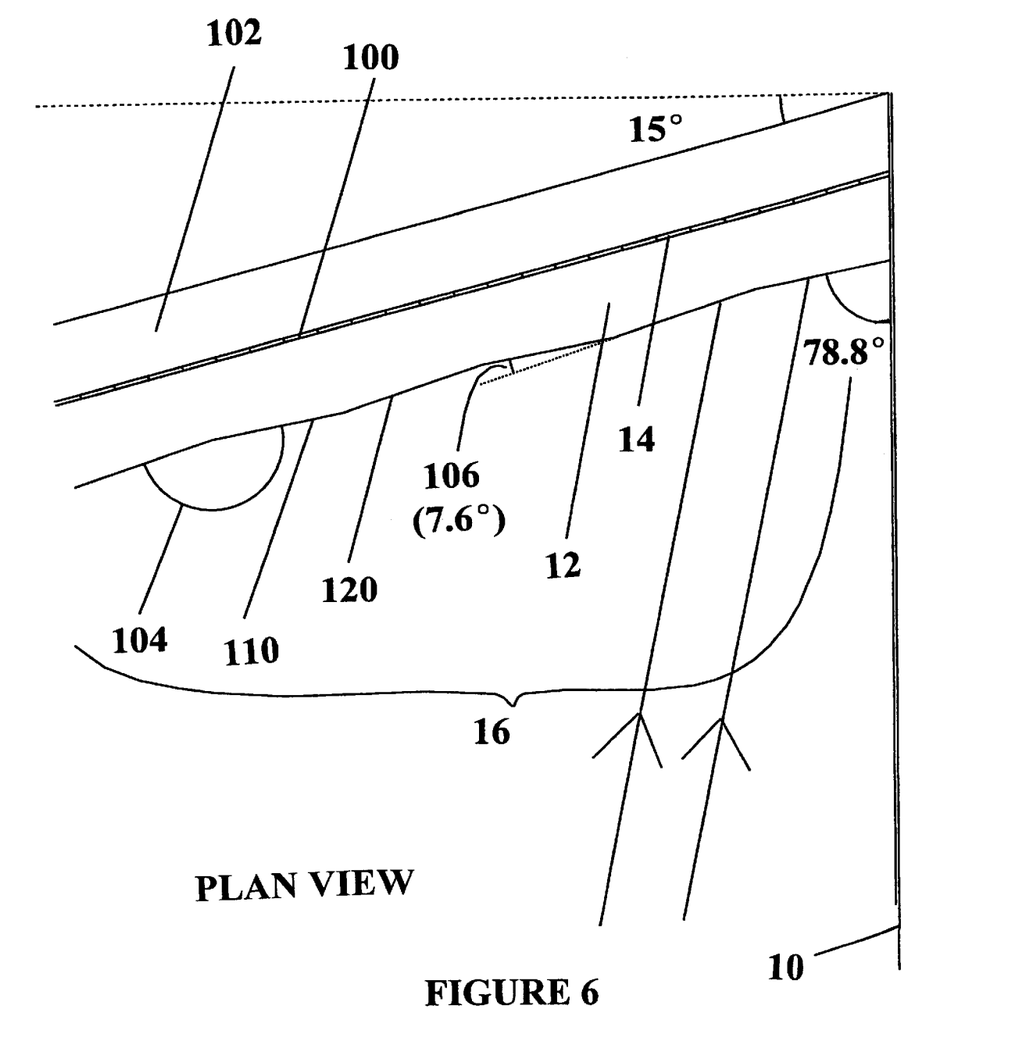
FIG. 6 shows the planar view of a typical mounting orientation of a mirror of the type represented by FIG. 2 on the left side of an automobile.

The conventional side view mirror characteristically presents a blind spot to the automobile driver because the mirror size is limited by the requirement that while fixed outside the body of the automobile, the mirror shall not be projecting excessively outwards. Commonly, the mirror has a width of about 6 inches, and the driver eyes are at a typical distance of about 30 inches from the mirror. Accordingly the mirror presents a view angle of roughly 12° width to the driver. An object moving closely alongside the vehicle, but not within the 12° range of view is not visible to the driver through the mirror, as illustrated in FIG. 4.

Figure 7:
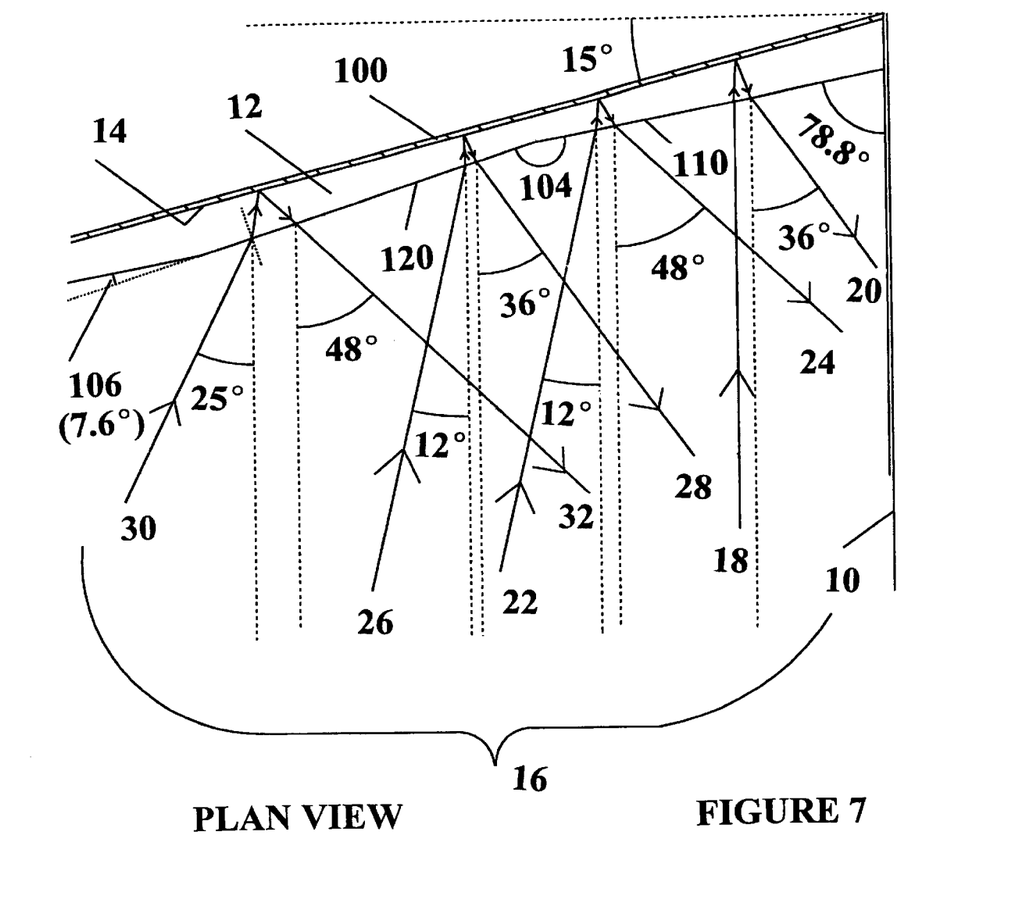
FIG. 7 is a sketch on a linearly amplified scale illustrating the enhancement of the directional range of view with contiguity and without overlap when reflections are made possible in two distinct ranges of directions from a single plane rear surface.
Figures 8A, 8B:
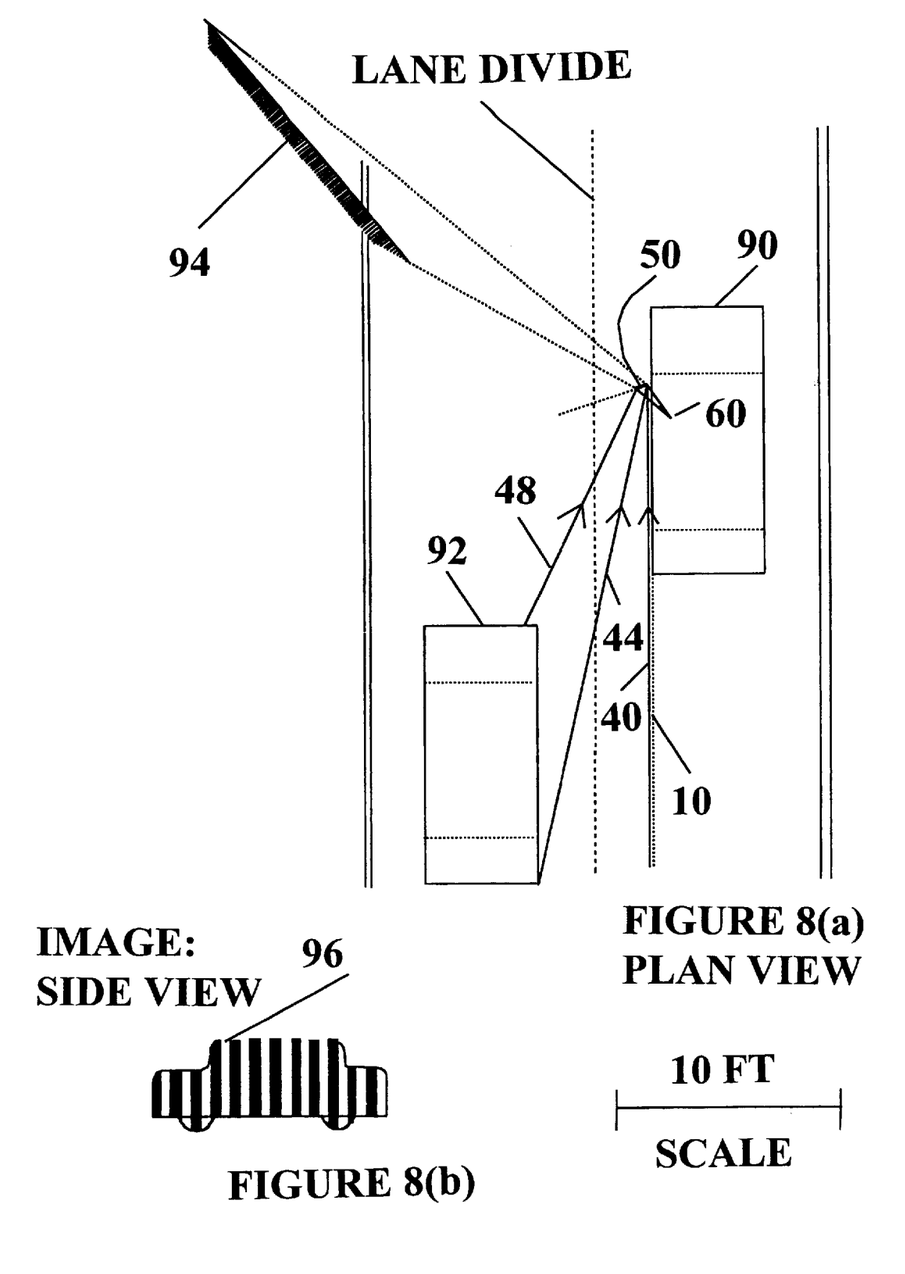
FIGS. 8(a) and 8(b) illustrate the elimination of the blind spot by use of the mirror of the invention, and the formation of striped images in the field of view.

The present invention can avoid a blind region in the field of view of the observer by providing a second range of view supplementing the range of view normally presented by a single reflecting plane. Two directions of reflection are hence to be made possible for light incident in a single direction. The second reflection is directed at such an inclination to the first that the two ranges of view obtained are contiguous, at the same time not overlapping. The reflection of a single beam of light from a plane surface into two distinct directions made possible by incidence on a zig-zagged surface is shown in FIG. 7. Since one of the surfaces of the mirror plate is made of parallel planar stripes of alternating inclinations, the overall surface dimensions of the mirror need not be increased; yet, the mirror piece can provide an enhanced field of view. Each planar stripe is narrow but has the full height of the mirror. This results in the images being made of vertical stripes with intermittent gaps as illustrated in FIG. 8(b). However, since the stripes forming the mirror surface are narrow relative to the overall width of the mirror, the images can be well resolved in form and size; particularly images of nearby objects.

DETAILED DESCRIPTION OF A PREFERRED EMBODIMENT

Although a number of variations of the invention device can be feasible, representing several embodiments, the following gives an illustrative description of a preferred embodiment of the invention and its working. In this embodiment, the plate, marked 12 representing the mirror is of transparent glass and has the configuration represented by FIG. 2. Hence, it is stipulated that in the most preferred embodiment, the rear surface 14 is planar and silvered, marked 100. The front surface 16 is zig-zagged and nonreflecting. The stripes, 110 and 120 forming the front surface contour are vertical while the mirror is fixed on the automobile. The glass plate 12 has dimensions approximately 4 inches vertically and 6 inches horizontally, and a thickness roughly 0.08 inch. A plane glass plate 102 of thickness ⅛ inch having the same area dimensions 4"×6" as the mirror plate is glued to the mirror in the rear for buffering the mechanical strength of the mirror plate 12 and for protecting the reflector coat 100 from corrosion and damage. A transparent protective cover plate can be optionally introduced in the front of the mirror plate 12, as specifically shown in the embodiments represented by FIGS. 3(*a*) and 3(*b*), denoted 101. A prime factor in the actual design of the mirror is the magnitude of the obtuse angle marked 104 that forms the zig zag of the front surface 16. This angle shall be determined optimally based on a number of factors, such as the positions of the driver seat inside a particular automobile and of the mirror mount on the auto body, the dimensions of the mirror and its directional orientation and the refractive index of the transparent mirror material. The said locations, the mirror dimensions and mounting, and the zig-zag angle determine the overall directional range of view of the driver, and in a preferred embodiment, the angle shall have such a value that the ranges of view presented by the two separate series of vertical reflecting stripes shall be continuous without overlap. The refractive index of the glass is a critical factor in the determination of the angle. Although any transparent material, having any refractive index may be acceptable in principle for the mirror material, Flint glass of refractive index 1.65 is accepted for the preferred embodiment presented herein. The 6" wide, 4" high mirror is made up of 24 parallel vertical planar stripes of alternating inclinations each of width ¼" and height 4". The optimal angle of mutual inclination, marked 106 has been determined to be 7.6°.

Since the optimal design parameters of the present invention and the mounting orientation can depend on the dimensional features of an automobile, and is hence expected to be distinct for various automobiles, the working of the invention may be best described with particular reference to a particular example of the mirror mounting and driver seat location. As a first step, the vision to be received by an automobile driver if the mirror were of the conventional single-direction reflector type, namely a plane mirror, is analyzed. Such a mirror would produce the blind region cited above. This is shown in FIG. 4, wherein the plane mirror is represented by the line 50. The eyes of the driver are represented for simplicity by a single point, marked 60. The distance between the mirror and the driver is taken to be 28". The mirror is mounted on the left side of the automobile, with its plane vertical and presenting an angle of inclination 72° to the left side of the auto, represented by the line 10. Thus the mirror presents to the driver, a range of look 36° to 48° relative to the left side body line 10 of the auto. A ray of light 40 grazing along the left body line of the auto represented by 10 is reflected along the direction marked 42, at 36° to the body line 10. A ray of light 44 incident on the mirror in position 50 at the outermost end at 12° to the body line 10 is reflected into the eyes of the driver at 48° inclination to the body line 10 along line 46. Thus the range of look into the plane mirror presents to the driver a view of the road on the left side having a directional range 0 to 12°. The vehicle on the left side marked 70 is in the blind region and is not visible by looking through the mirror.

The working of the most preferred embodiment of the invention is illustrated in detail with reference to FIG. 7 drawn on an amplified linear scale. Herein, the mirror is so mounted on the auto body that the rear reflecting plane surface, marked 14 is oriented approximately in a vertical plane at 75° inclination to the left auto body line, marked 10. The zig-zagged surface of the front, marked 16, consists of vertical stripes oriented alternately at 78.8° and 71.2° to the body line 10. The obtuse angle, marked 104, of the zig-zagged surface 16 at the front is hence 172.4°. Ray of light 18, parallel to the body line 10 is incident on the front surface 16 at a point on the surface where the stripe, marked 110, is oriented at 78.8° to the auto body line 10. It is refracted through the glass material 12 of the mirror of refractive index 1.65 to be reflected from the rear surface 14 to be emerging as ray 20 at 36° to the auto body line 10. As seen from FIG. 4, this ray is directed toward the point 60 representing the eyes of the driver. For simplicity of discussion, the lines of sight of the right and left eyes are not distinguished herein. Ray 22 traveling at 12° to the auto body line 10 is incident on the mirror on the same front surface stripe 110 as the one on which ray 18 is incident, and emerges as 24 after reflection from the rear surface of the mirror at 48° to the body line 10, also directed toward point 60. Thus rays 18 and 22 represent the extreme directions of the visible range of incidence on the stripe 110 oriented at 78.8° to the auto body line 10. Similarly, rays 26 and 30, which are incident on the surface stripe, marked 120 oriented at 71.2° emerge after reflections in directions marked 28 and 32 at 36° and 48° to the auto body line 10, which pass through the observer point 60. These rays represent the extreme directions of a range of view at 12° to 25° inclination to the body line 10. Thus, the surface stripe 120 oriented at 71.2° presents a range of view that supplements that provided by the stripe 110 oriented at 78.8°. Since the overall width of the mirror is only 6", it can be said that parallel stripes present overlapping directional ranges of view. Therefore one series of stripes 110 present the directional range 0 to 12°, and the other 120 the range 12° to 25°; two ranges that are contiguous without overlap. The overall range is somewhat more than double the directional range provided by the single plane mirror of the same size in position 50, presented in FIG. 4.

The result of the invention is illustrated in FIG. 8. The driver of vehicle 90 shall not be able to see vehicle 92 by using a conventional side view mirror, in position marked 50, which presents a directional range bordered by lines 40 and 44. The mirror of the invention, if used at position 50 in place of the conventional plane mirror shall extend the directional range beyond line 44 to line 48, so that the vehicle 92 is clearly visible in the mirror view. The vehicle 92 is seen in the apparent position 94. As stated above, the image consists of vertical stripes, and is accordingly presented as 96 in FIG. 8(*b*).

What is claimed is:

1. A automobile side-view mirror comprising:

a planar back support;

a transparent front plate;

a reflective coating;

the reflective coating positioned between the planar back support and the transparent front plate;

the transparent front plate having a first planer surface and a second zig-zagged surface; and said zig-zagged surface comprising series of two alternatingly parallel surfaces, wherein series of two alternatingly parallel surfaces form a series of obtuse angles.

2. The mirror of claim 1, and further comprising:

the series of two alternatingly parallel surfaces including a first surface facing a first direction and a second surface facing a second direction different from the first direction;

the first direction being slightly offset to the back support on one side of a normal direction to the back support;

the second direction being slightly offset to the back support on the other side of a normal direction to the back support; and, the two offsets being substantially equal.

3. The mirror of claim 2, and further comprising:

the zig-zag shaped surface of the transparent front plate facing away from the back support; and, the reflective coating being applied to the back support.

4. The mirror of claim 2, and further comprising:

the zig-zagged surface of the transparent front plate facing away from the back support; and, the reflective coating being applied to the first surface of the transparent front plate.

5. The mirror of claim 2, and further comprising:

the zig-zag shaped surface of the transparent front plate facing toward the back support; and, the reflective coating being applied to the back support.

6. The mirror of claim 2, and further comprising:

the zig-zagged surface of the transparent front plate facing the back support; and, the reflective coating being applied to the zig-zag shaped surface.

7. The mirror of claim 2, and further comprising:

the first and second directions being offset mutually between 5° and 10° approximately.

8. The mirror of claim 1, and further comprising a transparent front cover plate;

the transparent front cover plate being substantially parallel to the back support.

* * * * *